(12) United States Patent
Bengtsson et al.

(10) Patent No.: US 7,153,481 B2
(45) Date of Patent: Dec. 26, 2006

(54) METHOD AND DEVICE FOR SEPARATING SULPHUR DIOXIDE FROM A GAS

(75) Inventors: Sune Bengtsson, Vaxjo (SE); Fredrik Jens Brogaard, Vaxjo (SE); Kerstin Forsgren, Vaxjo (SE); Rikard Hakansson, Vaxjo (SE); Kjell Nolin, Asarum (SE)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 10/559,754

(22) PCT Filed: Jun. 17, 2004

(86) PCT No.: PCT/SE2004/000975

§ 371 (c)(1),
(2), (4) Date: Dec. 7, 2005

(87) PCT Pub. No.: WO03/004137

PCT Pub. Date: Jan. 16, 2003

(65) Prior Publication Data

US 2006/0117953 A1    Jun. 8, 2006

(30) Foreign Application Priority Data

Jun. 26, 2003 (SE) .................................. 0301866

(51) Int. Cl.
*B01D 53/34* (2006.01)
*B01D 53/50* (2006.01)
*B01J 10/00* (2006.01)
*B01J 10/02* (2006.01)

(52) U.S. Cl. ................. 423/243.01; 423/243.08; 423/243.09; 422/168; 422/169; 422/176

(58) Field of Classification Search ............ 423/243.01, 423/243.08, 243.09; 422/168, 169, 176
See application file for complete search history.

(56) References Cited

U.S. PATENT DOCUMENTS 5,693,301 A * 12/1997 .ANG.hman ............ 423/243.03
5,759,505 A *  6/1998 Nolin et al. ............ 423/243.08
7,094,382 B1 *  8/2006 Bengtsson et al. ...... 423/243.01

FOREIGN PATENT DOCUMENTS

WO    WO 03004137    1/2003

OTHER PUBLICATIONS

PCT International Search Report dated Sep. 29, 2004 (PCT/SE2004/000975).

* cited by examiner

*Primary Examiner*—Timothy C. Vanoy
(74) *Attorney, Agent, or Firm*—Arthur E. Fournier, Jr.; Timothy J. Olson

(57) ABSTRACT

A device (1) for separating sulphur dioxide from a gas (4) by means of an absorption liquid has an inlet (2) for gas (4) containing sulphur dioxide, an outlet (18) for gas (16), from which sulphur dioxide has been separated, and as essentially horizontal apertured plate (8), which is arranged to allow passage from below of sulphur dioxide containing gas (4) and to carry, on its upper side (12), a flowing layer (14) of the absorption liquid. An outlet box (20) beside the apertured plate (8) is arranged to be passed by liquid, which is distributed in the gas (4) coming from the inlet (2). A first pumping means is arranged to feed a coolant flow to the outlet box (20) and a second pumping means is arranged to feed an absorption liquid flow, which is essentially independent of the coolant flow, to the apertured plate (8) to form the flowing layer (14). In a method of separating sulphur dioxide, the above-described device (1) can be used.

20 Claims, 13 Drawing Sheets

METHOD AND DEVICE FOR SEPARATING SULPHUR DIOXIDE FROM A GAS

TECHNICAL FIELD

The present invention relates to a method of separating sulphur dioxide from a gas by means of an aqueous absorption liquid, in which method the gas is first passed through a contact zone, in which the gas is mixed with a liquid flowing out of an outlet box, and is then passed upwards through an essentially horizontal apertured plate which is arranged beside the outlet box and on which a flowing layer of the absorption liquid is provided.

The invention also relates to a device for separating sulphur dioxide from a gas by means of an aqueous absorption liquid, said device comprising a) an inlet for gas containing sulphur dioxide and an outlet for gas, from which sulphur dioxide has been separated, b) an essentially horizontal apertured plate which is mounted between the inlet and the outlet and which is arranged to allow passage from below of gas containing sulphur dioxide and to carry, on its upper side, a flowing layer of the absorption liquid, c) at least one outlet box which is arranged to be passed by liquid and which is arranged beside the apertured plate, d) a distributing means which is arranged in the outlet box to distribute liquid in the gas coming from the inlet, before the gas is passed upwards and through the apertured plate.

BACKGROUND ART

Sulphur dioxide is a gas formed by oxidation of materials containing sulphur, such as coal, oil, natural gas, industrial and domestic waste and peat. Sulphur dioxide can also be produced as a residual product in chemical processes, for instance in metallurgical processes. It is usually not allowed to emit large quantities of sulphur dioxide into the atmosphere, and therefore some kind of cleaning is necessary. One example is flue gas cleaning in power plants and other combustion plants. The flue gas generated in combustion in such plants is usually cleaned by, inter alia, absorption of sulphur dioxide in an absorption liquid. The absorption liquid may contain, for instance, water and one or more of the substances lime, limestone, dolomite, sodium hydroxide solution and similar substances, which are suitable for absorption of sulphur dioxide.

WO 03/004137 discloses a method and a device for removing sulphur dioxide from a gas. In the method, the flue gas is passed upwards through an apertured plate with a flowing layer of an absorption liquid provided thereon. The absorption liquid that has flown along the apertured plate is collected and made to flow downwards to a container. The flue gas which is to be cleaned first passes through a contact zone, in which it is contacted with the absorption liquid flowing downwards from the apertured plate, and is then passed upwards through the apertured plate. In this manner, it is achieved that the flue gas is saturated with water vapour before it reaches the underside of the apertured plate. However, it has been found that the method according to WO 03/004137 causes an unnecessarily high pressure drop in the contact zone.

SUMMARY OF THE INVENTION

The object of the present invention therefore is to provide an effective method of separating sulphur dioxide, in which method the above drawbacks of prior-art technique are eliminated or significantly reduced.

According to the invention, this object is achieved by a method which is of the type stated by way of introduction and characterised in that a coolant flow is fed to the outlet box to be passed therethrough and flow out in the contact zone, and an absorption liquid flow, which is essentially independent of the coolant flow, is fed to the apertured plate to form said flowing layer, which separates sulphur dioxide from the gas.

An advantage of this method is that the coolant flow rate can be controlled according to what is necessary for sufficient cooling of incoming gas independently of the absorption liquid flow rate. In connection with changes of the load, for instance flow rate, temperature and sulphur dioxide content of the gas, the two flow rates can, independently of each other, be controlled in such a manner that the necessary cooling and the separation of sulphur dioxide, respectively, are achieved. A further advantage is that the method reduces the pressure drop in the gas since the coolant flow rate can be reduced significantly compared with prior art and still provide the necessary cooling. A further advantage is that the absorption liquid that has flown over the apertured plate is not used as a coolant, which is the case in prior art. Absorption liquid that has flown over the apertured plate has a high content of dissolved sulphur dioxide, which in a cooling process could be evaporated and in an undesirable manner again be mixed with the flue gas.

According to a preferred embodiment, the outlet box is elongate and extends along a lateral edge of the apertured plate, the absorption liquid flow being passed over the apertured plate in a direction which is essentially parallel to the longitudinal direction of the outlet box. An elongate outlet box results in good cooling of the flue gas since the flue gas will have good contact with the liquid flowing out of the outlet box. The arrangement of the outlet box along the lateral edge of the apertured plate results in a very compact construction. The liquid that has flown out of the outlet box and which is entrained by the flue gas will in an advantageous way wet the underside of the apertured plate and reduce the risk of incrustations.

Preferably, the coolant flow flowing out of the outlet box is collected in a container containing liquid, whose liquid surface is located at a level below the contact zone, a passage, through which the gas is passed horizontally under the outlet box, extending between the liquid surface and the outlet box, and a parameter, which is representative of the level of the liquid surface, and thus the height of the passage, being controlled in such a manner that the average velocity of the gas in the passage is in the range of 5–35 m/s. An advantage of this is that the conditions in the cooling process can be adjusted to the current load in such a manner that good cooling, good wetting of the underside of the apertured plate and a low pressure drop in the gas are achieved.

According to a preferred embodiment, the coolant flow flowing out of the outlet box and the absorption liquid flow flowing out of the apertured plate are collected in a common container. An advantage of this embodiment is that the method can be carried out in a simple and uncomplicated plant. According to a still more preferred embodiment, the coolant flow and the absorption liquid flow are fed from the common container. An advantage of this embodiment is that the same liquid is used for cooling and absorption. Consequently this requires only one system for handling of liquid and no devices for keeping two different liquids separated.

According to a preferred embodiment, the ratio of the hydrostatic liquid pressure in the outlet box to the pressure difference between a first point just before the contact zone and a second point above the liquid surface in the outlet box is controlled by means of the coolant flow rate in such a manner that said hydrostatic liquid pressure is greater than said pressure difference. By means of the coolant flow rate, the height of the liquid column in the outlet box is thus adjusted in such a manner that flue gas cannot enter through the bottom of the outlet box. According to a still more preferred embodiment, the height of liquid in the outlet box is controlled in such a manner that, with regard to the coolant flow rate, a flow-out velocity suitable for cooling is achieved at the bottom of the outlet box.

Preferably the flue gas is conducted essentially horizontally under the outlet box. An advantage of this is that the cooling of the flue gas will be effective since the flue gas has a horizontal flow direction when passing under the outlet box and through the contact zone generated under the outlet box. A further advantage is that the flue gas will be horizontally directed also when it reaches the apertured plate arranged beside the outlet box. This reduces the pressure drop and improves the distribution of the flue gas in the layer of absorption liquid flowing over the apertured plate.

Another object of the present invention is to provide a simple device for separating sulphur dioxide, in which device the above drawbacks of prior-art technique are eliminated or significantly reduced. According to the invention, this object is achieved by a device which is of the type stated by way of introduction and characterised in that the device also comprises e) a first pumping means for feeding a coolant flow to the outlet box, f) a second pumping means for feeding an absorption liquid flow, which is essentially independent of the coolant flow, to the apertured plate for forming the flowing layer.

An advantage of this device is that it has a wide range of capacity due to the fact that the coolant flow rate and the absorption liquid flow rate are independent of each other. As a result, the load, for instance flow rate, temperature, moisture content and sulphur dioxide content of the flue gas, can be allowed to vary within wide limits without jeopardising the function of the device. For instance, setting of a suitable thickness of the layer of flowing liquid, which thickness gives a stable layer, can be made using merely the second pumping means without any interaction from the first pumping means. Another advantage is that the pressure drop in the flue gas will be low, which reduces the demands on the mechanical strength of the device.

According to a preferred embodiment, a container is arranged to collect the coolant flow flowing out of the outlet box, the container containing liquid, whose liquid surface is located under the outlet box and thus forms a passage for gas between the liquid surface and the outlet box. The liquid surface makes it possible to control the height of the passage and, thus, also the velocity of the flue gas.

According to a preferred embodiment, a common container is arranged to collect the coolant flow flowing out of the outlet box and the absorption liquid flow flowing out of the apertured plate. An advantage of this is that the device will be simple in terms of construction. According to a still more preferred embodiment, the liquid surface in the container extends both under essentially the entire apertured plate and under essentially the entire outlet box. An advantage of this is that liquid flowing out of the outlet box and the apertured plate will be collected against a liquid surface. This prevents wear and wet-dry zones, which could be the result of the liquid being collected on, for instance, a metal surface.

According to a preferred embodiment, the apertured plate has the shape of a rectangular plate with a first lateral edge which is parallel to the outlet box, and a second lateral edge which is perpendicular to the first lateral side edge, the first pumping means as well as the second pumping means consisting of mammoth pumps which are arranged in succession along a line parallel to the second lateral edge. An advantage of this embodiment is that mammoth pumps can pump liquids with high contents of suspended solids, without being subjected to significantly increased wear. High contents of suspended solids give the advantage that the device will be smaller and less expensive since a smaller container volume is required for a certain amount of solids. A mammoth pump operated by compressed air performs oxidation of unoxidised substances in the liquid, such as sulphite ions, simultaneously with the liquid transport. The rectangular shape of the apertured plate together with the mammoth pumps arranged along a line perpendicular to the longitudinal direction of the outlet box result in an especially compact construction.

According to a preferred embodiment, the apertured plate has the shape of a rectangular plate which is divided into two parts by the second pumping means, which seen from above has the form of an elongate mammoth pump, which is arranged to distribute the absorption liquid flow over the two parts, the outlet box being elongate and arranged along a first lateral edge of the apertured plate and forming an essentially right angle to the longitudinal direction of the mammoth pump. Since absorption liquid is conducted in two opposite directions over the two parts of the apertured plate, absorption liquid pumped by the mammoth pump will travel a shorter distance over the apertured plate. This results in a reduced pressure drop in the gas and improved separation of sulphur dioxide.

According to a still more preferred embodiment, the device has a first and a second apertured plate which each have the shape of a substantially rectangular plate, which is divided into two parts by a second pumping means each, seen from above, in the form of an elongate mammoth pump, which is arranged to distribute the absorption liquid flow over the two parts, a first and a second elongate outlet box being arranged along a first lateral edge of the first and the second apertured plate respectively and forming a substantially right angle to the longitudinal direction of the respective mammoth pumps, an inlet gap for incoming gas extending between the two outlet boxes. This embodiment results in an especially compact and simple construction.

According to another embodiment, the device has a first container, which is arranged to collect the coolant flow flowing out of the outlet box, and a second container, which is arranged to collect at least part of the absorption liquid flow flowing out of the apertured plate. An advantage of this embodiment is that the level of liquid in the two containers can be set independently of each other. According to another preferred embodiment, the device has a third pumping means which pumps liquid from the first container to the second container. This has the advantage that the level in the first container can be lower than the level in the first container. According to another preferred embodiment of this device, the first pumping means and the second pumping means are arranged to feed the coolant flow and the absorption liquid flow, respectively, from the second container. This embodiment gives a compact and inexpensive design since only one liquid is to be handled in the device.

According to a preferred embodiment, the distributing means comprises at least one nozzle, whose characteristic measure, such as a minimum hole diameter (D) or a minimum gap width (V), is 1–8 cm. These measures have been found to give good distribution of the liquid in the gas.

According to a preferred embodiment, the outlet box has a bottom which is located essentially on the same level as the underside of the apertured plate. An advantage of this is that the bottom of the outlet box and the bottom of the apertured plate will be aligned with each other. This results in a lower pressure drop in the gas since the surface under which the gas is conducted does not have any projecting portions. A further advantage is that, when the coolant and the absorption liquid are collected in a common tank, the height to which the absorption liquid must be pumped for the apertured plate to be reached will be lower compared with the cases, like in prior-art technique, when the bottom of the outlet box is positioned a distance below the underside of the apertured plate.

Additional advantages and features of the invention will be evident from the following description and the appended claims.

BRIEF DESCRIPTION OF THE DRAWINGS

The invention will now be described in more detail by way of a number of embodiments and with reference to the accompanying drawings.

FIG. 12b is an enlarged partial view in the vertical plane and illustrates the area XIIb shown in FIG. 12a.

DESCRIPTION OF PREFERRED EMBODIMENTS

Figure 1:
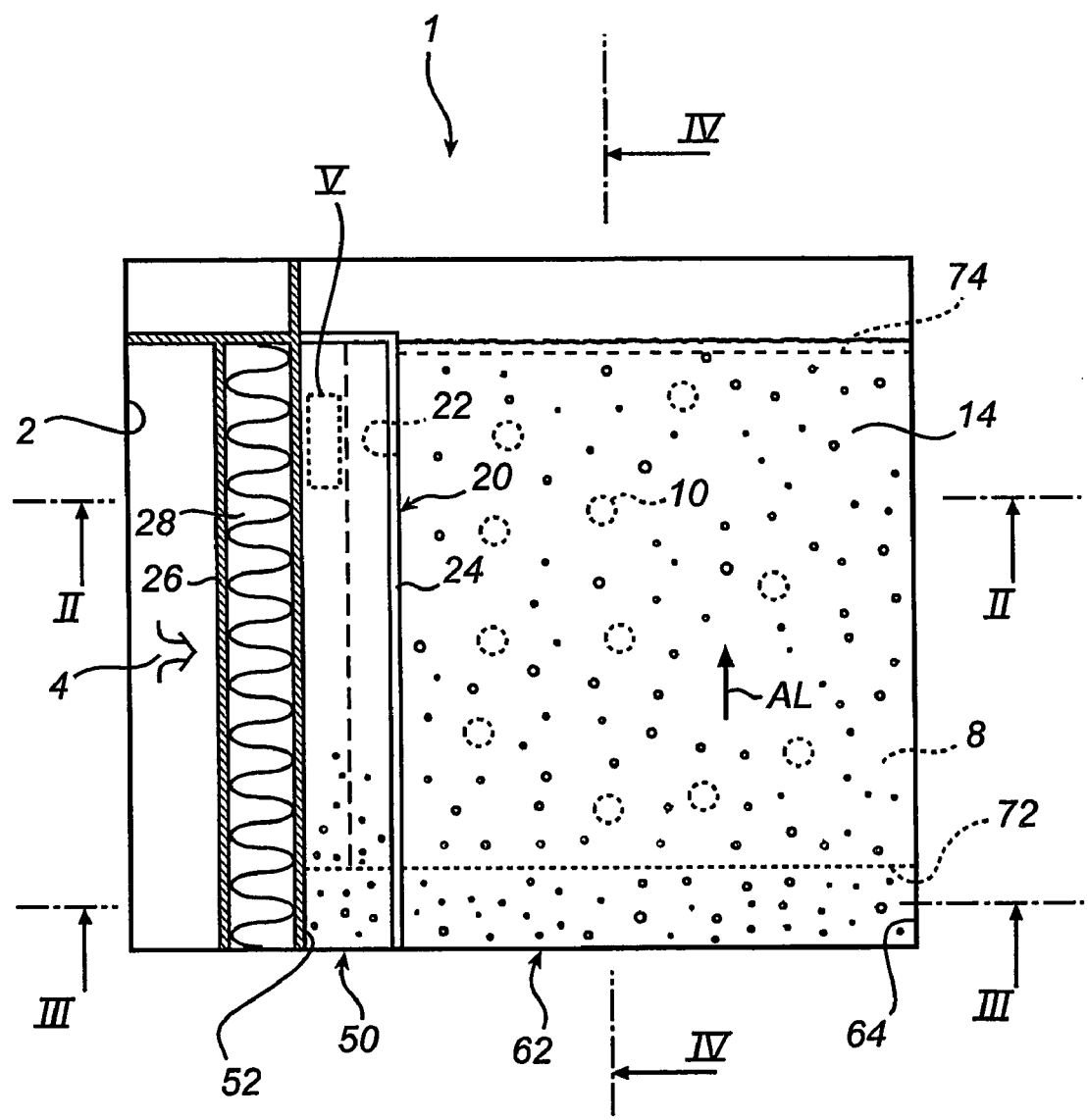
FIG. 1 is a sectional view in the horizontal plane and schematically illustrates a device according to the invention.
Figure 2:
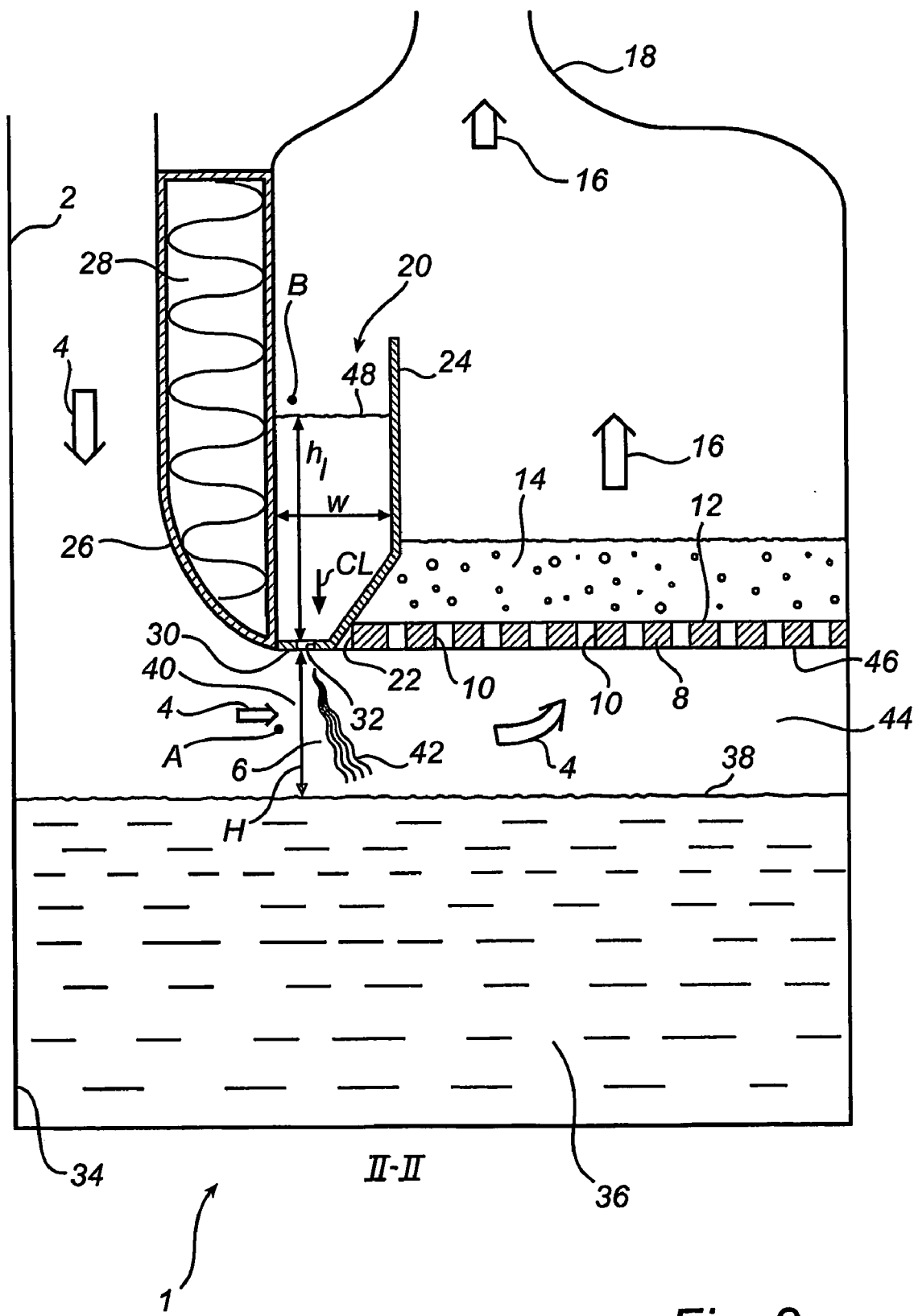
FIG. 2 is a sectional view in the vertical plane and shows section II—II in FIG. 1.

FIG. 1 shows schematically a device 1 according to the present invention. The device 1 has an inlet 2 for flue gas 4 from a boiler (not shown). As is best seen in FIG. 2, the flue gas 4 is in a first step passed through a contact zone 6. In the contact zone 6 the flue gas 4 is mixed with a liquid in such a manner that the gas is cooled and essentially saturated with water vapour by part of the liquid being evaporated. The flue gas 4 is then passed on to a horizontal rectangular apertured plate 8. The apertured plate 8 has a number of evenly distributed holes 10, through which the flue gas 4 can pass. On its upper side 12 the apertured plate 8 carries a flowing layer 14 of absorption liquid. As the flue gas 4 passes through the flowing layer 14 of absorption liquid, sulphur dioxide is separated from the flue gas 4. The cleaned flue gas 16 leaves the device 1 through an outlet 18 for cleaned flue gas 16.

The contact zone 6 is supplied with liquid from an elongate outlet box 20. The outlet box 20, which extends along a first lateral edge 22 of the apertured plate 8 and is open upwards, has an elongate side wall 24 which separates the outlet box 20 from the flowing layer 14 of absorption liquid. The outlet box 20 is defined towards the gas inlet 2 by an elongate double-walled guide rail 26 which is provided with insulation 28 for preventing liquid condensation in the gas inlet 2. The outlet box 20 has a bottom 30 which is provided with distributing means in the form of nozzles 32. The nozzles 32 are adapted to distribute liquid, which is indicated by an arrow CL in FIG. 2 and which flows down towards the bottom 30 and out through the outlet box 20, in the contact zone 6 and thus contact the liquid with the flue gas 4 which is conducted horizontally under the bottom 30 of the outlet box 20. The liquid which flows out of the outlet box 20 and has not been evaporated is collected in a container 34. The liquid 36 in the container 34 has a liquid surface 38 which extends under essentially the entire apertured plate 8 and also under essentially the entire outlet box 20. Between the bottom 30 of the outlet box 20 and the liquid surface 38 there is a passage in the form of a gap 40 through which the flue gas 4 can pass. As is evident, the flue gas 4 will act on a flow of liquid 42 leaving the nozzles 32, in such a manner that this flow 42 will not be vertical but deflected at the lower edge. It is important for the flow 42 to be so heavy in terms of droplet size and flow rate that a dense liquid curtain is provided all the way from the outlet box 20 to the liquid surface 38. The gap 40 between the liquid surface 38 and the outlet box 20 has at the nozzles 32 a height H which is controlled by the liquid level in the container 34, i.e. the position of the liquid surface 38. At a certain flow rate of flue gas 4, a certain height H will result in a certain velocity of the gas 4 in the gap 40. It has been found that this gas velocity should not exceed about 35 m/s. At higher gas velocities, the pressure drop in the gap 40 increases. A still greater drawback at higher velocities is that the flue gas 4 will entrain the major part of the liquid leaving the nozzles 32. This increases the pressure drop in the space 44 formed between the liquid surface 38 and the apertured plate 8 and fills the holes 10 with liquid, whereby the pressure drop increases also in these. The gas velocity in the gap 40 should be higher than about 5 m/s to ensure good contact between the flue gas 4 and the liquid distributed by the nozzles 32. Also at about 5 m/s, the flue gas 4 will entrain part of the liquid that is distributed by the nozzles 32. However, this is an advantage since the entrained liquid will wet the underside 46 of the apertured plate 8 and reduce the risk of incrustations on the underside 46. As is evident from FIG. 2, the bottom 30 of the outlet box 20 and the underside 46 of the apertured plate 8 are located in essentially the same horizontal plane. This gives, together with the rounded shape of the guide rail 26, a low pressure drop in the flue gas 4.

The outlet box 20 is designed in such a manner that a desired flow of liquid leaves the nozzles 32. To prevent the flue gas 4 from passing through the nozzles 32 instead of through the holes 10, the outlet box must have a certain hydrostatic pressure $P_l$. A pressure difference $dP_r$ in the flue gas can be measured from a point A, which is located just before the contact zone 6, and a point B, which is located just above the liquid surface 48 in the outlet box 20. The hydrostatic pressure $P_l$ in the outlet box 20 can then be calculated as a height $h_l$, from the bottom 30 of the outlet box 20 to the liquid surface 48 straight above the bottom 30, multiplied by the density of the liquid in the outlet box 20 and the acceleration due to gravity g. To prevent flue gas from passing through the nozzles 32, $P_l$ must be greater than $dP_r$. The liquid leaving the nozzles 32 must have a certain velocity to provide good contact between this liquid and the flue gas 4 in the contact zone 6. It has been found that a liquid velocity of 0.2–3 m/s is appropriate. To provide this liquid velocity, the hydrostatic pressure $P_l$ in the outlet box 20 must be significantly greater than $dP_r$. It has been found that a height $h_l$, which is at least about 100 mm higher than the height required to merely correspond to $dP_r$, is appropriate to provide the abovementioned liquid velocity. It will also be appreciated that, at a small height H, a high pressure drop is obtained in the gap 40, which increases the pressure difference $dP_r$, which in turn requires a great height $h_l$ in the outlet box 20.

Figure 3:
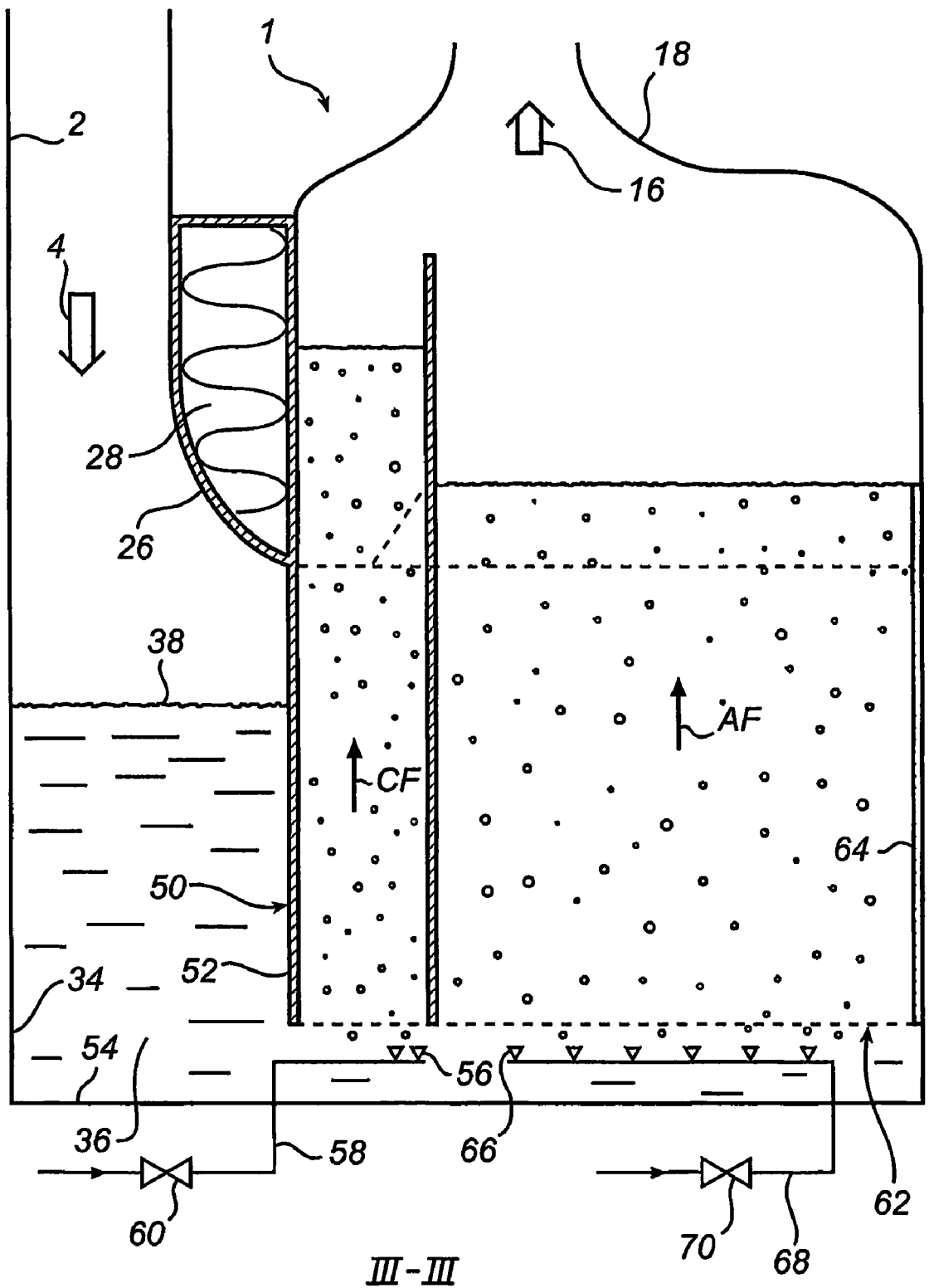
FIG. 3 is a sectional view in the vertical plane and shows section III—III in FIG. 1.

FIG. 3 shows a first pumping means in the form of a first mammoth pump 50. The mammoth pump 50 has a vertical tube 52 which extends vertically upwards from a level just above the bottom 54 of the container 34 to the outlet box 20. The mammoth pump 50 also has a number of air nozzles 56 which are arranged vertically under the tube 52 and which through a conduit 58 with a control valve 60 arranged on the same is supplied with compressed air. The compressed air lowers the density of the liquid 36 and provides an upward liquid flow, indicated by an arrow CF, in the tube 52. This upward liquid flow will reach the outlet box 20 and be distributed in the same and then flow out in the contact zone 6, as described above. The liquid flow generated by the mammoth pump 50 can thus be called coolant flow since in the contact zone 6 it will flow out and cool the incoming flue gas 4. This coolant flow generated by the first mammoth pump 50 suitably corresponds to an L/G (i.e. liquid flow rate relative to gas flow rate) of about 2–5 litres liquid/m$^3$ flue gas. The control valve 60 is adjusted in such a manner that the height $h_l$ in the outlet box 20 results in a suitable L/G and a suitable flow-out velocity from the nozzles 32. A typical value of $h_l$ is 0.5–1 m. Thus the valve 60 can be used to adjust the coolant flow rate according to the flow rate of the flue gas 4 and also according to the temperature and water content of the flue gas 4 in such a manner that sufficient cooling of the flue gas 4 and sufficient wetting of the underside 46 of the apertured plate 8 are provided. The width w of the outlet box 20, which is evident from FIG. 2, should at least in the upper portion of the outlet box 20 be sufficient for air bubbles coming along from the mammoth pump 50 to find their way to the liquid surface 48 instead of being entrained downwards by the liquid. To this end, the vertical downwardly directed liquid velocity in the outlet box 20 is suitably about 1 m/s maximum, preferably about 0.5 m/s maximum. Such a velocity has been found suitable to provide good deareation of the liquid, which also increases the density of the liquid. The selection of w is also influenced by the conditions that the longitudinally directed horizontal velocity in the outlet box 20 should not be too high, and that the interior of the outlet box 20 should be accessible for inspection and maintenance.

As shown in FIG. 3, the device 1 also has a second pumping means in the form of an elongate second mammoth pump 62. The mammoth pump 62 has a vertical tube 64 which extends vertically upwards from a level just above the bottom 54 of the container 34 to the upper side 12 of the apertured plate 8. The mammoth pump 62 also has a number of air nozzles 66 which are arranged vertically under the tube 64 and which through a conduit 68 with a control valve 70 arranged on the same are supplied with compressed air. The compressed air lowers the density of the liquid 36 and provides an upward liquid flow, indicated by an arrow AF, in the tube 64. This upward liquid flow will reach the upper side 12 of the apertured plate 8 and form the layer 14 flowing horizontally over the apertured plate 8. The liquid flow generated by the mammoth pump 62 can thus be called absorption liquid flow since on the apertured plate 8 it will separate and absorb sulphur dioxide from the incoming flue gas 4. The absorption liquid flow generated by the second mammoth pump 62 suitably corresponds to an L/G (i.e. liquid flow rate relative to gas flow rate) of about 10–50 litres absorption liquid/m$^3$ flue gas and usually about 15–30 litres absorption liquid/m$^3$ flue gas. The control valve 70 is controlled in such a manner that the layer 14 will have a sufficient thickness to be able to separate the desired amount of sulphur dioxide from the flue gas. A typical thickness of the layer 14 is 0.2–0.3 m, i.e. considerably smaller than the typical liquid height $h_l$ in the outlet box 20. The valve 70 is used to adjust the absorption liquid flow rate according to the flow rate of the flue gas 4 and the sulphur dioxide content of the flue gas 4 in such a manner that a stable layer 14 is obtained and sufficient separation of sulphur dioxide is provided. Thus the first mammoth pump 50 and the second mammoth pump 62 can be controlled independently of each other to generate a coolant flow which is adapted to cool the current flue gas 4 and, respectively, an absorption liquid flow rate which is independent of the coolant flow rate and is adapted to separate sulphur dioxide from the current flue gas 4.

The liquid 36 is an absorption liquid which essentially consists of a mixture of limestone, which is supplied to the container 34 from a storage (not shown) of a limestone suspension, and water and also gypsum and calcium sulphite formed in the separation of sulphur dioxide from the flue gas 4. The absorption liquid 36 can be prepared, for instance, in the manner disclosed in the WO 96/00122. As is evident from FIG. 3, both the coolant flow and the absorption liquid flow are supplied from the container 34. Thus both the coolant flow and the absorption liquid flow consist of absorption liquid 36. The content of solids in the absorption liquid can be as high as 20–30% by weight and, in some cases, higher than 30% by weight thanks to the mammoth pumps 50, 62 not having any movable parts which can be subjected to increased wear in case of high solids contents.

Figure 4:
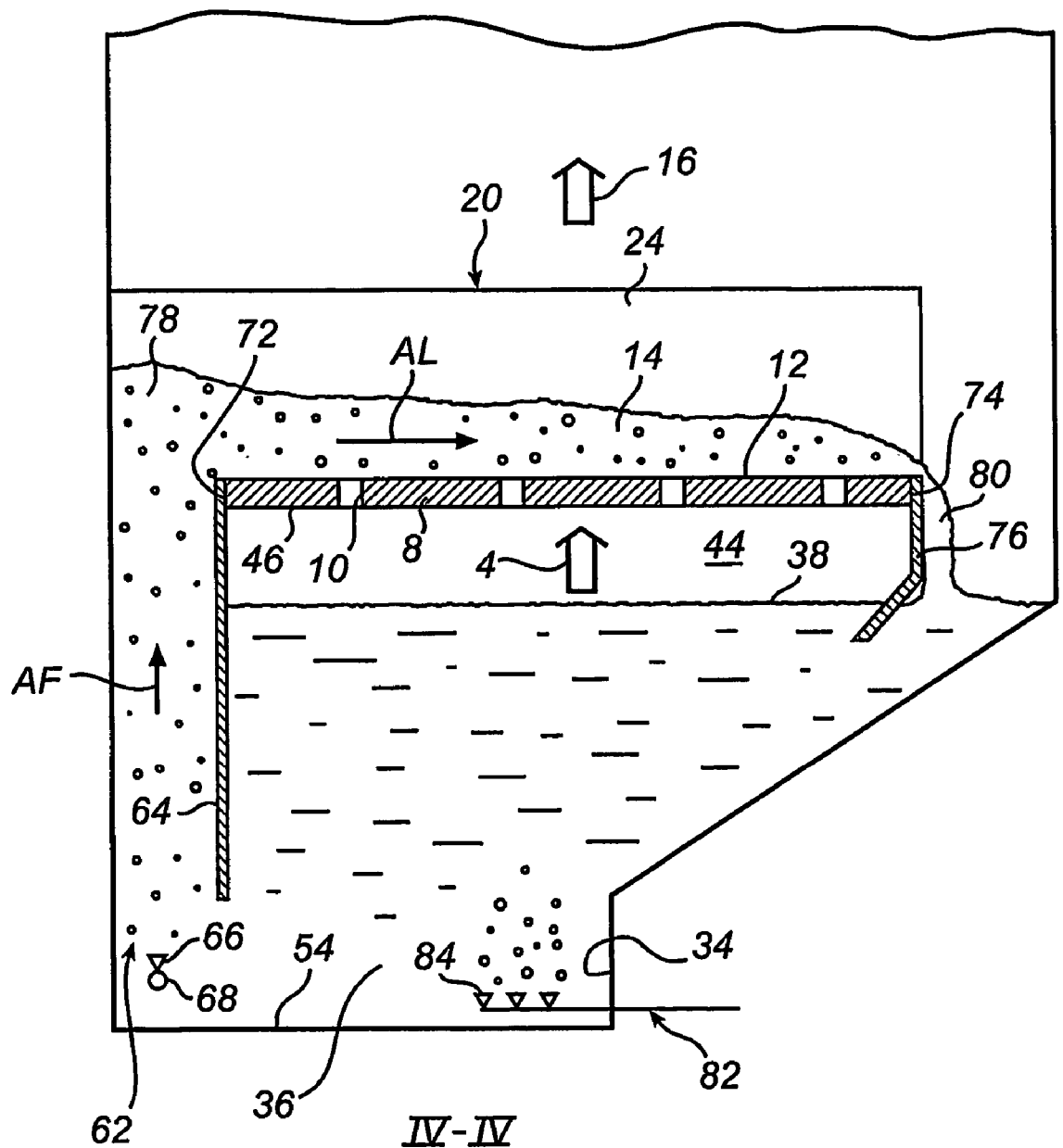
FIG. 4 is a sectional view in the vertical plane and shows section IV—IV in FIG. 1.

FIG. 4 shows how the elongate mammoth pump 62 is arranged along a second lateral edge 72 of the rectangular apertured plate 8, which second lateral edge 72 forms a right angle to the first lateral edge 22 and hence also to the longitudinal direction of the outlet box 20. Thus, the first mammoth pump 50 and the second mammoth pump 62 are arranged in succession along a line parallel to the second lateral edge 72, which is also evident from FIG. 1.

It is also evident from FIG. 4 how the layer 14 of absorption liquid is passed horizontally over the apertured plate 8 from the second mammoth pump 62 in a direction, indicated by an arrow AL, that is parallel to the longitudinal direction of the elongate outlet box 20. This results in a crosscurrent relationship between the flow of flue gas 4 and the layer 14 of absorption liquid flowing over the apertured plate 8. A guide rail 76 is attached to a third lateral edge 74 opposite to the second lateral edge 72. The guide rail 76 extends from the apertured plate 8 and down under the liquid surface 38 in order to prevent the flue gas 4 from passing beside the apertured plate 8. Absorption liquid that has flown over the apertured plate 8 will at the third lateral edge 74 flow downwards along the guide rail 76 and be collected in the container 34. At the second lateral edge 72 an inlet zone 78 will thus be formed for absorption liquid, which is fed to the apertured plate 8 and, at the third lateral edge 74, an outlet zone 80 will be formed for absorption liquid, which leaves the apertured plate 8. Thus the absorption liquid 36 will be passed over the upper side 12 of the apertured plate 8 so as then, through the outlet zone 80, to be recirculated to the container 34 and treated with air for oxidation of sulphite before the absorption liquid 36 is again conducted as an absorption liquid flow to the upper side 12 of the apertured plate 8, or as a coolant flow to the outlet box 20. This prevents sulphur dioxide from being evaporated from the absorption liquid, which could have been the case if absorption liquid with a high sulphite content had been used for cooling in the contact zone 6. The low sulphite content of the coolant flow now instead results in the liquid flow 42 providing a certain absorption of sulphur dioxide in the contact zone 6.

A certain amount of absorption liquid will also flow downwards through the holes 10 and be collected in the container 34. The container 34, which extends both under the entire apertured plate 8 and under essentially the entire outlet box 20, thus is a collecting container which is common to the coolant flow that has flown out of the outlet box 20 and the absorption liquid flow that has flown over the apertured plate 8 and which collects the liquid flowing out of the outlet box 20 as well as the absorption liquid flowing from the layer 14 down through the holes 10 and the absorption liquid that has reached the outlet zone 80.

In absorption of sulphur dioxide in an absorption liquid containing limestone, calcium sulphite is formed. This should be converted into calcium sulphate, i.e. gypsum, to provide a reusable residual product and to minimise the risk of incrustations in the device, especially on the apertured plate 8. The compressed air flow used in the two mammoth pumps 50, 62 corresponds to an admixture of air of about 20–25% to the liquid that is fed upwards in the respective mammoth pumps 50, 62. In most cases, this amount of air is sufficient to oxidise formed calcium sulphite into gypsum. In some cases, for instance when the flue gas 4 itself has a very low oxygen content, it may be convenient to use a separate oxidation device 82, which by means of nozzles 84 supplies extra oxidation air to the absorption liquid 36 in the container 34.

Figure 5A:
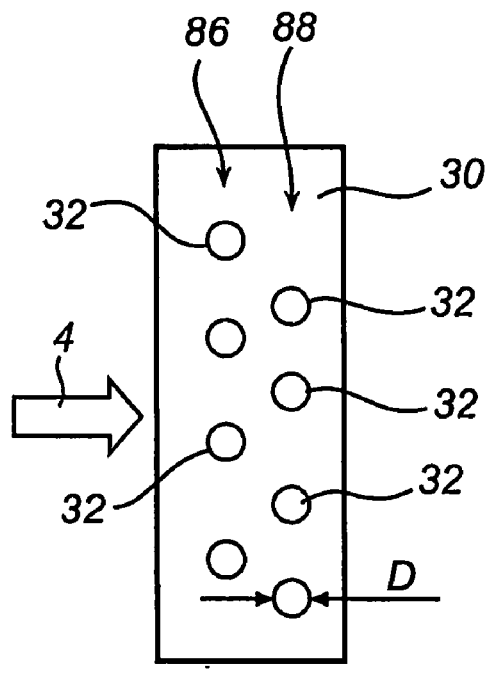
FIG. 5a is a top plan view and shows the area V in FIG. 1.

FIG. 5a shows the area V, indicated in FIG. 1, of the bottom 30 of the outlet box 20. The bottom 30 is provided with a first, seen in the horizontal flow direction of the flue gas 4, row 86 of nozzles 32 and a second, seen in said flow direction, row 88 of nozzles 32. The nozzles 32 have the form of circular holes. The shape of the circular holes can be cylindrical or, at one end, be rounded, bevelled or have some other form suitable for nozzles. The smallest diameter D, i.e. the narrowest cross-section in the nozzles 32, should be about 1–8 cm, preferably about 1–5 cm. With a diameter smaller than about 1 cm, droplets are obtained in the contact between the coolant flow and the flue gas 4, which are so small that they are to a great extent entrained by the flue gas 4 and cause an increased pressure drop and reduced cooling of the flue gas. With nozzles 32 having a diameter greater than about 8 cm, a poor contact is obtained between the coolant flow and the flue gas 4, the saturation of the flue gas with water vapour being insufficient. As is evident from FIG. 5a, the nozzles 32 in the row 86 are offset relative to the nozzles 32 in the row 88. The purpose is to prevent bands of flue gas 4 from passing the contact zone 6 without water vapour being added.

Figure 5B:
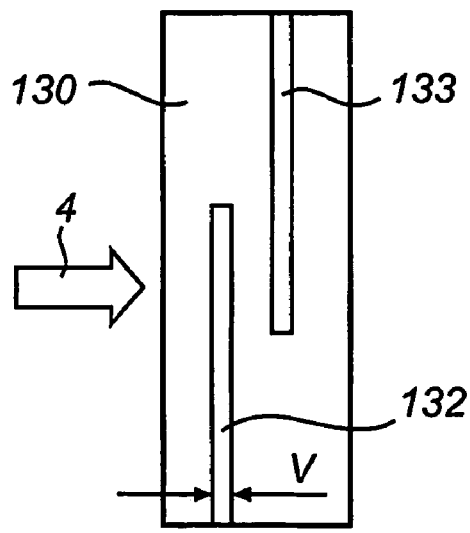
FIG. 5b is a top plan view and shows an alternative embodiment of a bottom of an outlet box.

FIG. 5b shows an alternative embodiment of the bottom 30 shown in FIG. 5a. The bottom 130 shown in FIG. 5b has a first, seen in the horizontal flow direction of the flue gas 4, gap 132 and a second, seen in said flow direction, gap 133. The two gaps 132, 133 overlap each other to prevent bands of flue gas 4 from passing the contact zone 6 without coming into contact with the coolant flow. The smallest gap width V, i.e. the narrowest cross-section in the gap 132, 133, should be about 1–5 cm for the same reasons as stated above for the circular nozzles 32.

Figure 6:
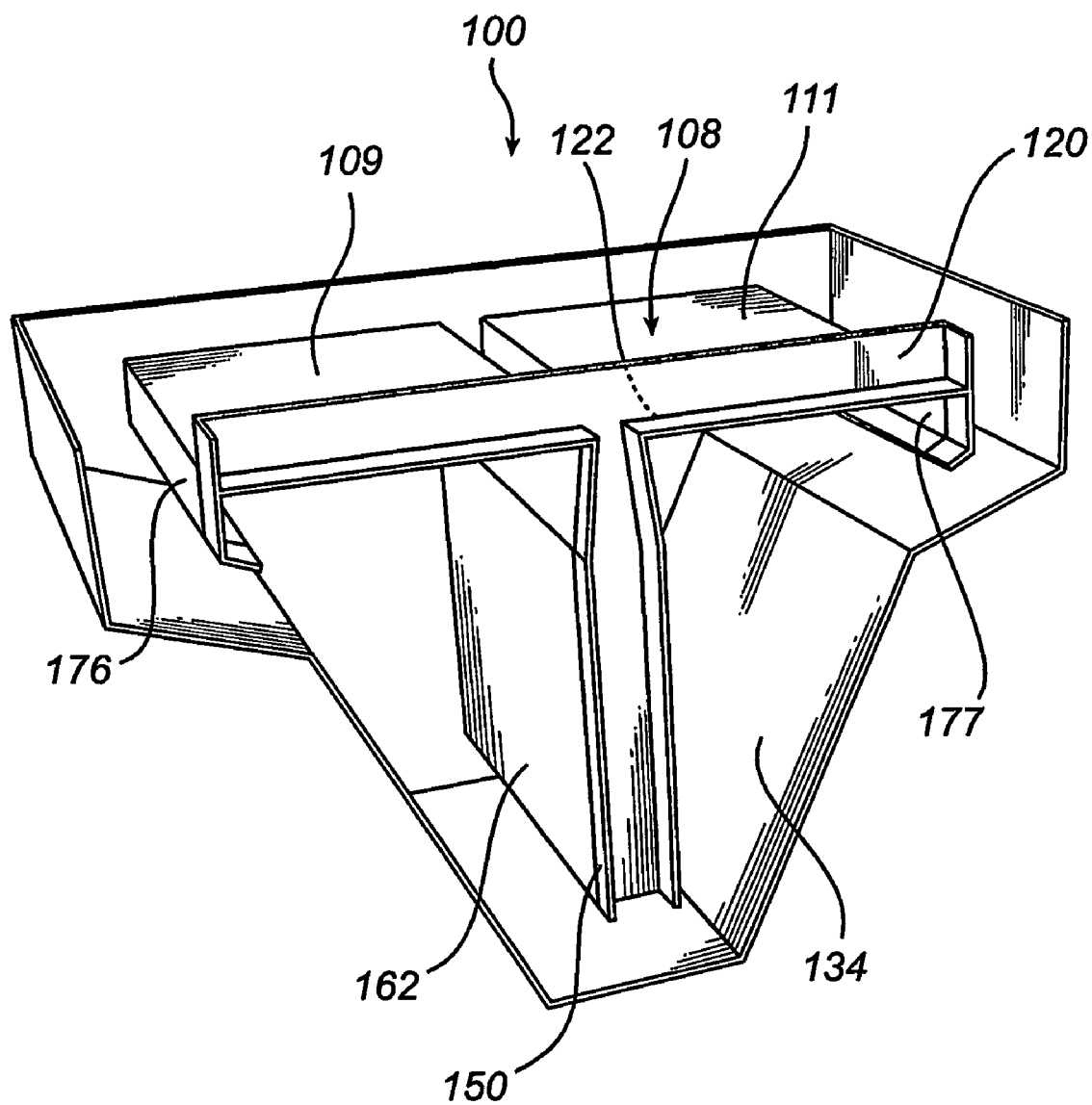
FIG. 6 is a sectional view in perspective and shows a device according to a second embodiment of the invention.

FIG. 6 illustrates a second embodiment of the invention in the form of a device 100. The device 100 differs from the device 1 by having a rectangular apertured plate 108, which is essentially of the same type as the apertured plate 8 described above, but which is divided into a first part 109 and a second part 111. Along the two parts 109, 111, and more specifically along a first lateral edge 122 of the apertured plate 108, extends an elongate outlet box 120. The outlet box 120 is supplied with a coolant flow by a first mammoth pump 150 mounted centrally on the outlet box 120. A centrally mounted, elongate second mammoth pump 162, which is aligned with the first mammoth pump 150 and perpendicular to the longitudinal direction of the outlet box 120, opens between the two parts 109, 111 of the apertured plate 108 and supplies an absorption liquid flow to each of the two parts. Flue gas will be supplied horizontally under the outlet box 120 on each side of the first mammoth pump 150 and will in a first step be cooled by a coolant flow flowing out of the outlet box 120. The flue gas will then pass upwards through the parts 109, 111 of the apertured plate 108 and the layer of absorption liquid flowing thereon (not shown in FIG. 6).

A container 134, which is a common collecting container and extends both under the entire apertured plate 108 and under the entire outlet box 120, collects the coolant flow that has flown out of the outlet box 120 and the absorption liquid flow that has flown over the apertured plate 108. Each part 109, 111 is provided with a guide rail 176, 177 that prevents flue gas from passing beside the respective parts 109, 111.

Figure 7:
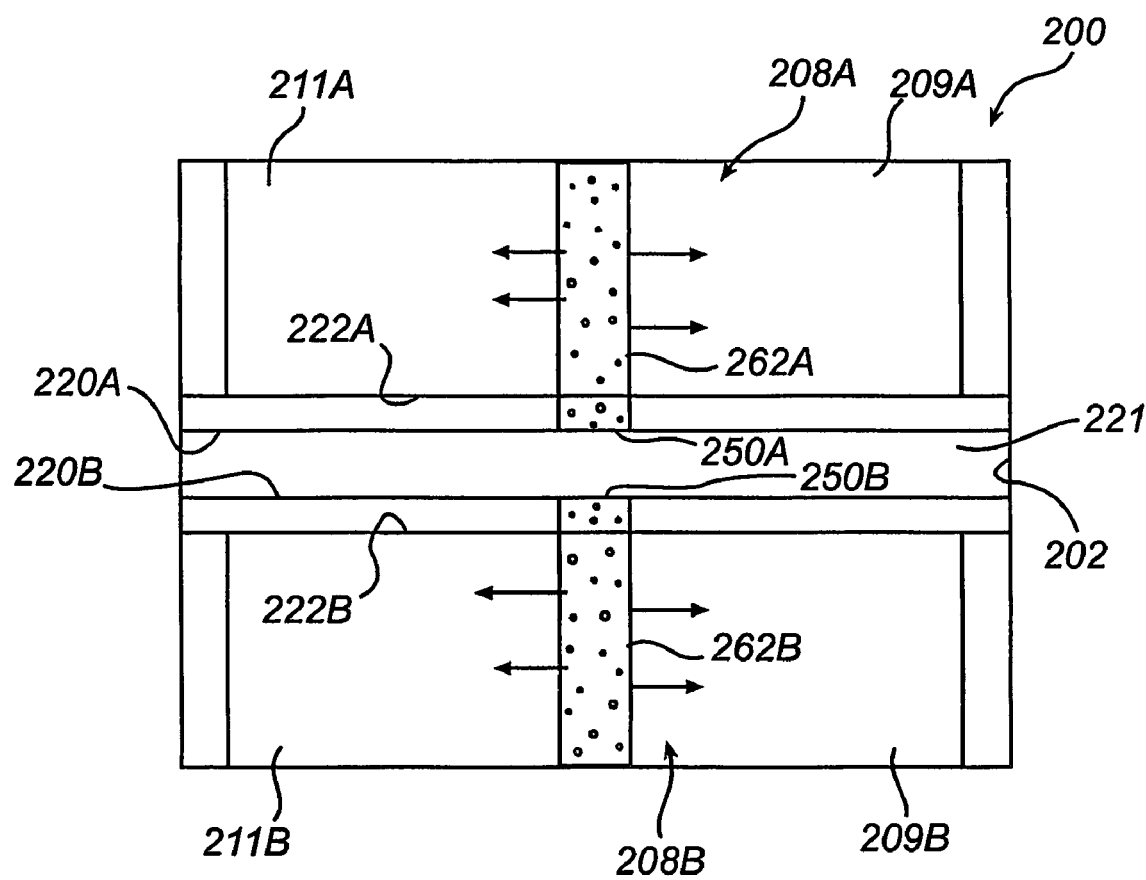
FIG. 7 is a sectional view in the horizontal plane and schematically illustrates a device according to a third embodiment of the invention.
Figure 8:
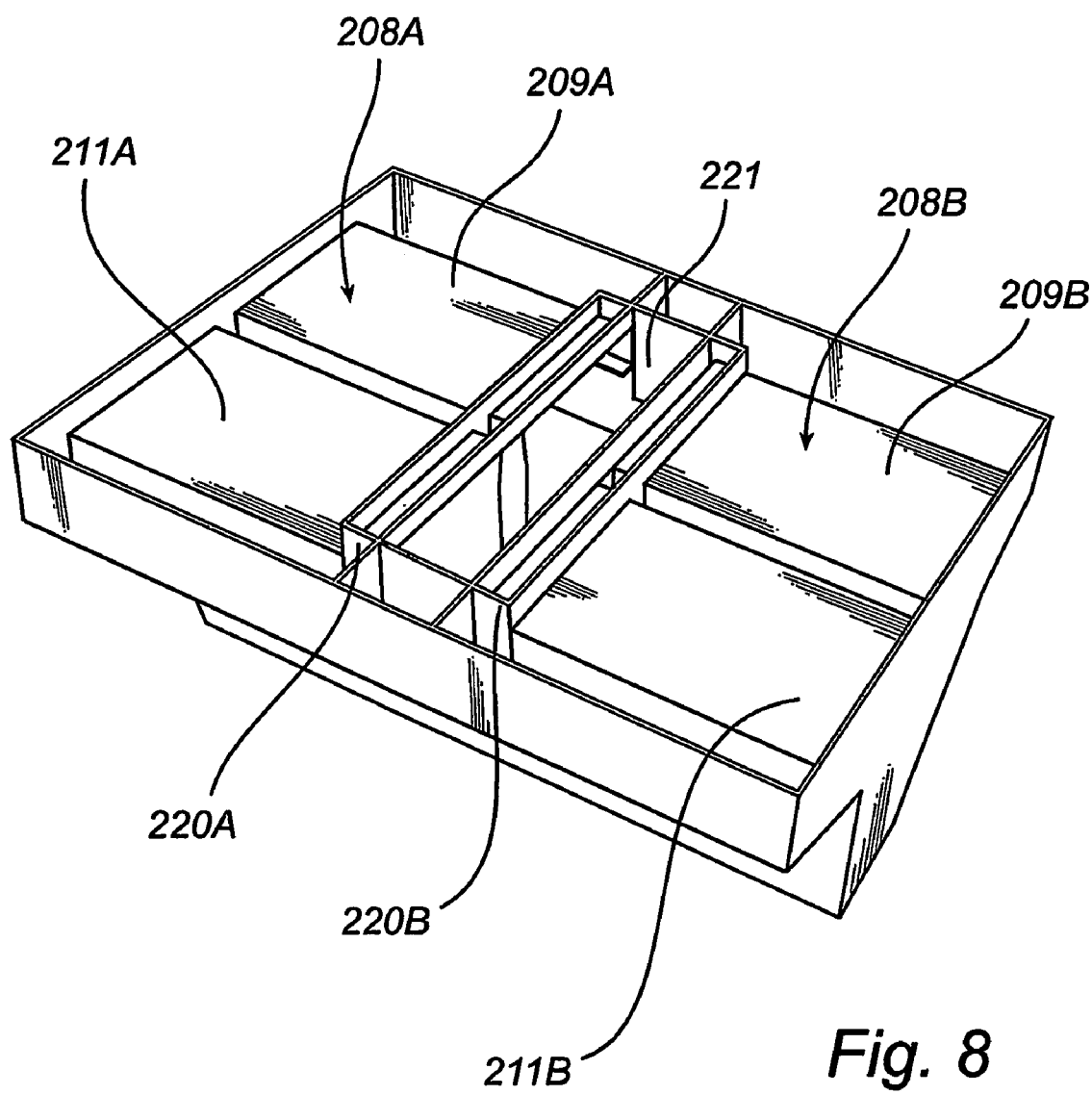
FIG. 8 is a sectional view in perspective and illustrates the device shown in FIG. 7.
Figure 9:
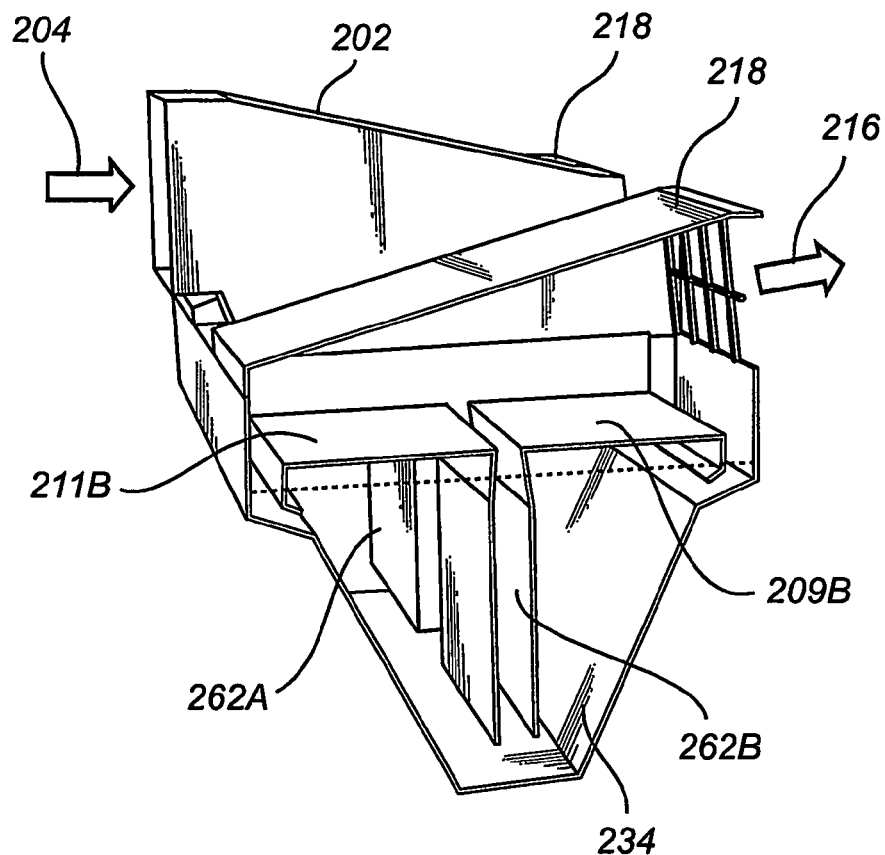
FIG. 9 is a sectional view in perspective and illustrates an inlet and outlets for gas in the device shown in FIG. 7.

FIGS. 7–9 illustrate a third embodiment of the invention in the form of a device 200. As is evident from FIG. 7, the device 200 has a first apertured plate 208A, which is divided into a first part 209A and a second part 211A, and a second apertured plate 208B, which is divided into a first part 209B and a second part 211B. A first elongate outlet box 220A is arranged along a first lateral edge 222A of the first apertured plate 208A, which is also to be seen in FIG. 8. A second elongate outlet box 220B is arranged along a first lateral edge 222B of the second apertured plate 208B. Between the two outlet boxes 220A, 220B, which are oriented towards each other, a gap 221 is formed, in which a gas inlet 202 opens.

The outlet box 220A is supplied with a coolant flow by a first mammoth pump 250A mounted centrally on the outlet box 220A. A centrally mounted, elongate second mammoth pump 262A, which is aligned with the first mammoth pump 250A and is perpendicular to the longitudinal direction of the outlet box 220A, opens between the two parts 209A, 211A of the apertured plate 208A and supplies each of the two parts 209A, 211A with an absorption liquid flow, illustrated by arrows in FIG. 7. Correspondingly, the second outlet box 220B is supplied by a first mammoth pump 250B and the second apertured plate 208B by an elongate second mammoth pump 262B.

The flue gas 204, which through the inlet 202, which is best-seen in FIG. 9, is supplied to the gap 221, will be distributed between the first and the second outlet box 220A, 220B and cooled by the respective coolant flows when passing horizontally under the respective outlet boxes 220A, 220B. The flue gas 204 will then pass through the layers (not shown in FIGS. 7–9) of absorption liquid provided on the parts 209A, 211A and 209B, 211B respectively, whereby sulphur dioxide is separated. The pressure drop in the gas across the layers of absorption liquid provided on the parts 209A, 211A, 209B, 211B is considerably greater than the pressure drop across the outlet boxes 220A, 220B. A control which ensures that the respective second mammoth pumps 262A, 262B pump a flow of the same size to the first apertured plate 208A and to the second apertured plate 208B, i.e. that the layers will have the same thickness on both apertured plates 208A, 208B, will also ensure that the flue gas 204 will be evenly distributed between the two outlet boxes 220A, 220B. The cleaned flue gas 216 then leaves the device 200 through outlets 218 for gas arranged on both sides of the inlet 202. The coolant flows that have flown out of the respective outlet boxes 220A, 220B and the absorption liquid flows that have flown out of the respective parts 209A, 211A, 209B, 211B are collected in a common container 234, from which the liquid is again fed by the respective mammoth pumps 250A, 262A, 250B, 262B.

Figure 10:
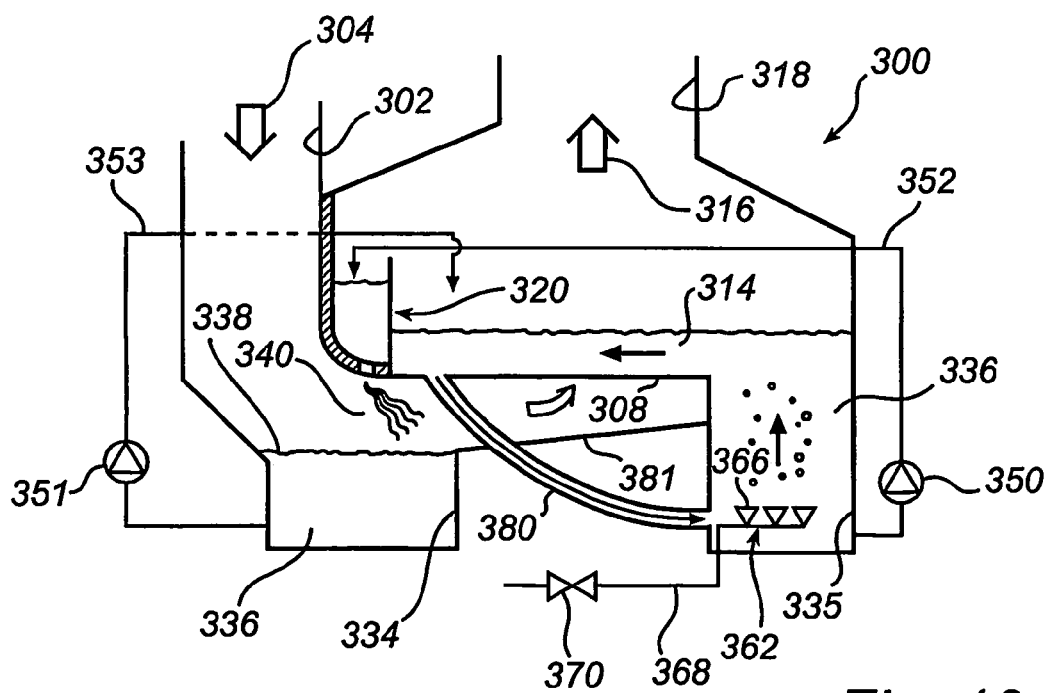
FIG. 10 is a sectional view in the vertical plane and schematically shows a device according to a fourth embodiment of the invention.

FIG. 10 shows a fourth embodiment of the invention in the form of a device 300. Flue gas 304 is introduced into the device 300 through an inlet 302. In a first step, the flue gas is cooled and saturated with water vapour when passing horizontally under an outlet box 320 which is of essentially the same type as the outlet box 20 that is shown in FIGS. 1 and 3. The flue gas is then passed upwards through an apertured plate 308 and passes through a flowing layer 314 of absorption liquid provided thereon, whereby sulphur dioxide is separated. Cleaned flue gas 316 leaves the device through an outlet 318. Liquid flowing out of the outlet box 320 is collected in a first container 334. The container 334 is provided with a recirculation pump 351, which advantageously can be a mammoth pump and which through a conduit 353 feeds liquid from the first container 334 to the layer 314. The container 334 contains liquid 336, whose liquid surface 338 is located under the outlet box 320. Between the liquid surface 338 and the bottom of the outlet box 320 a gap 340 is thus formed, through which the flue gas 304 must pass. The level of the liquid surface 338, and thus the width of the gap 340, can be controlled by means of the recirculation pump 351 in such a manner that a gas velocity is provided, which is suitable for the cooling of the flue gas 304 by the liquid flowing out of the outlet box 320. The outlet box 320 is supplied with a coolant flow in the form of absorption liquid 336 from a second container 335. A first pump 350, which can be a mammoth pump, feeds through a conduit 352 the absorption liquid 336, corresponding to an L/G of about 2–5 l/m$^3$ flue gas, from the second container 335 to the outlet box 320. A second pump in the form of a mammoth pump 362, which comprises compressed air nozzles 366, a compressed air line 368 and a control valve 370, feeds an absorption liquid flow in the form of absorption liquid 336 from the second container 335 to the flowing layer 314 and over the apertured plate 308. The absorption liquid flow pumped by the mammoth pump 362 corresponds to about 15–30 l/m$^3$ flue gas. At an end, opposite to the second pump 362, of the apertured plate 308 a return conduit 380 is arranged, which recirculates the absorption liquid to the second container 335. Thus the recirculation pump 351 will pump liquid from the first container 334 to the second container 335 via the layer 314 and the return conduit 380. The absorption liquid which possibly flows through the holes of the apertured plate 308, not shown in FIG. 10, is collected on an inclined bottom 381 and passed to the first container 334. The level in the second container 335, can independently of the level in the first container 334, be set at a level, usually higher than the level in the first container 334, which means that a minimum of pumping work is required to generate the layer 314 and also the coolant flow to the outlet box 320.

Figure 11:
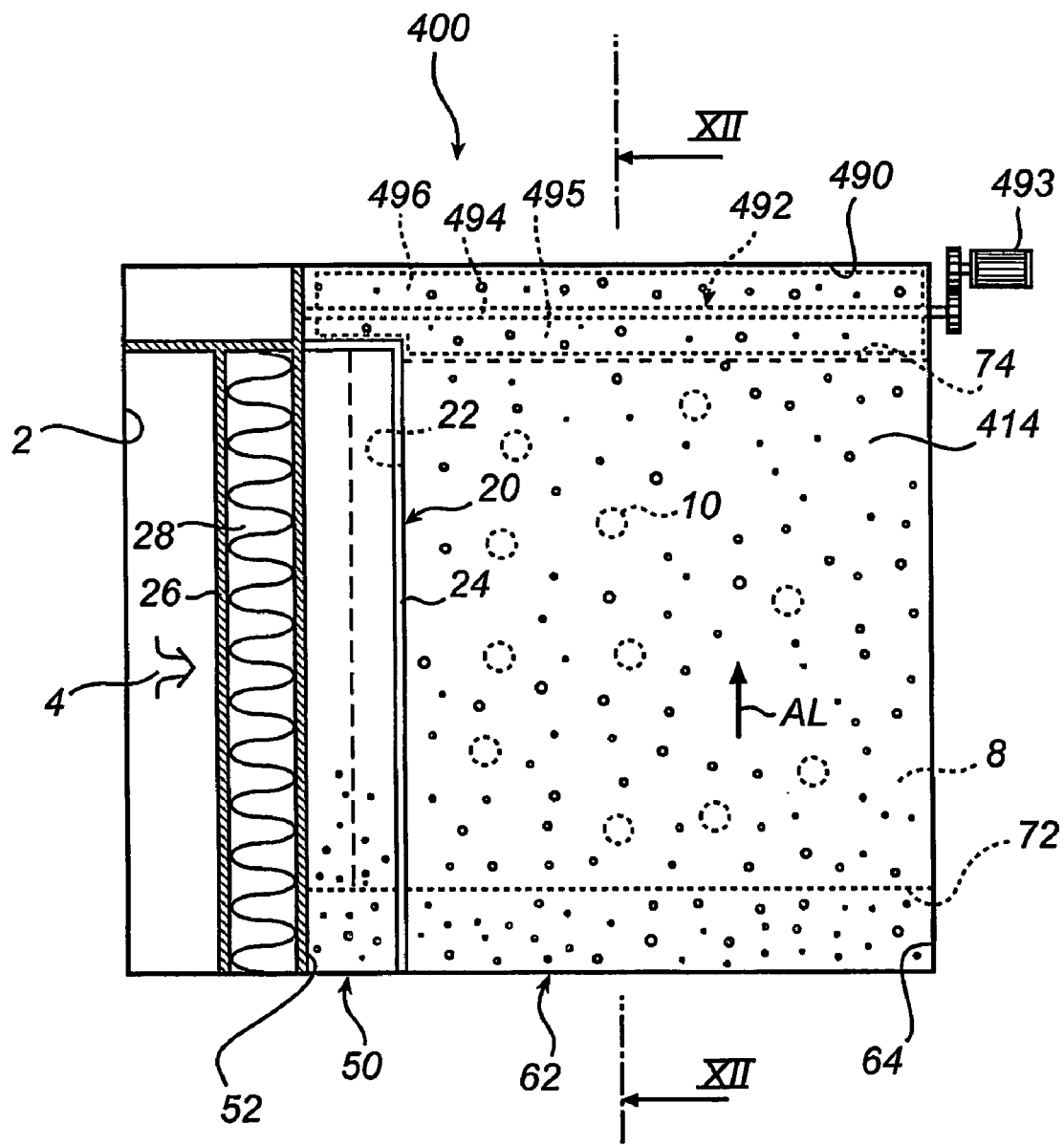
FIG. 11 is a sectional view in the horizontal plane and schematically shows a device according to a fifth embodiment of the invention.
Figure 12A:
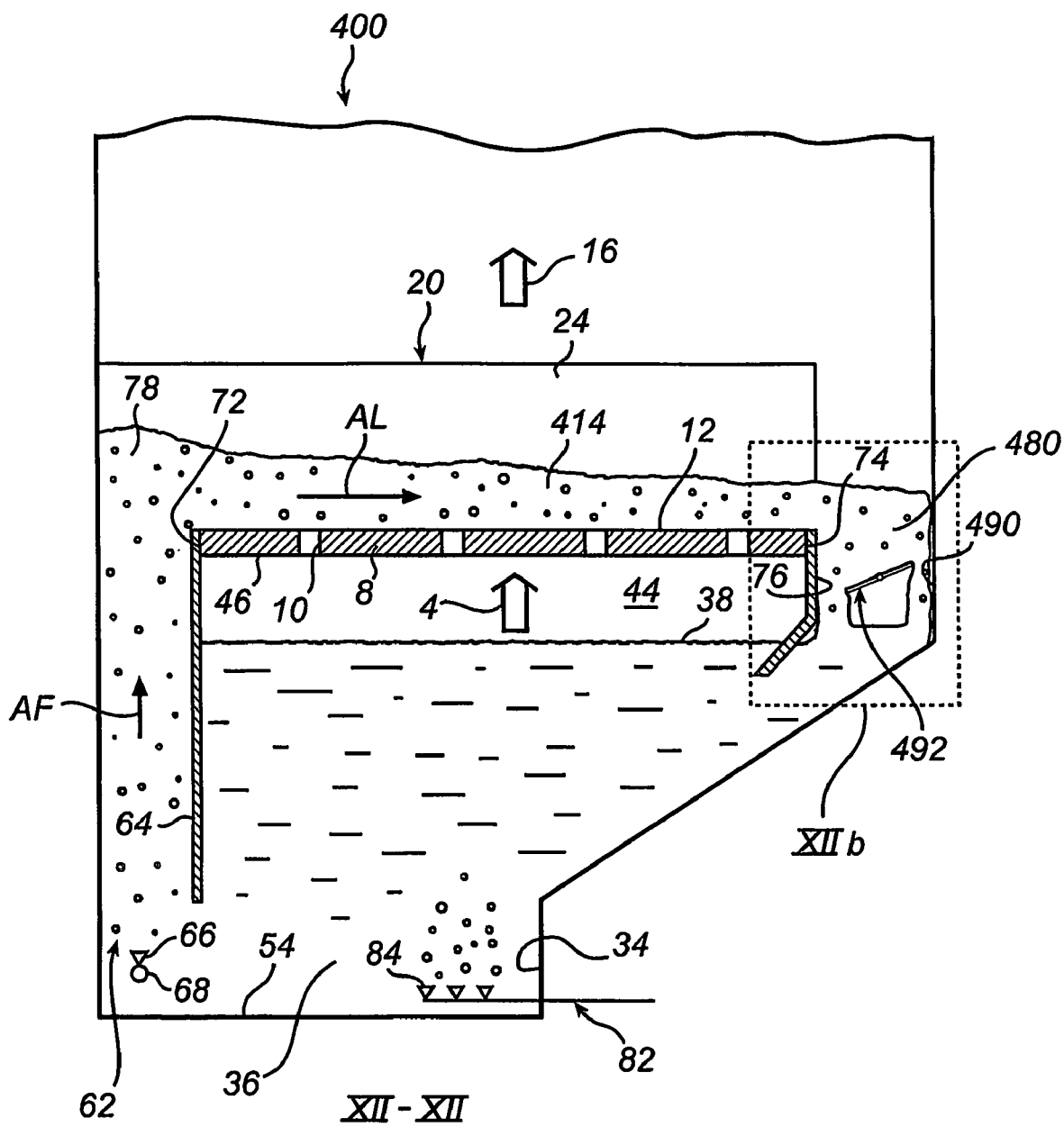
FIG. 12a is a sectional view in the vertical plane and shows section XII—XII in FIG. 11.
Figure 12B:
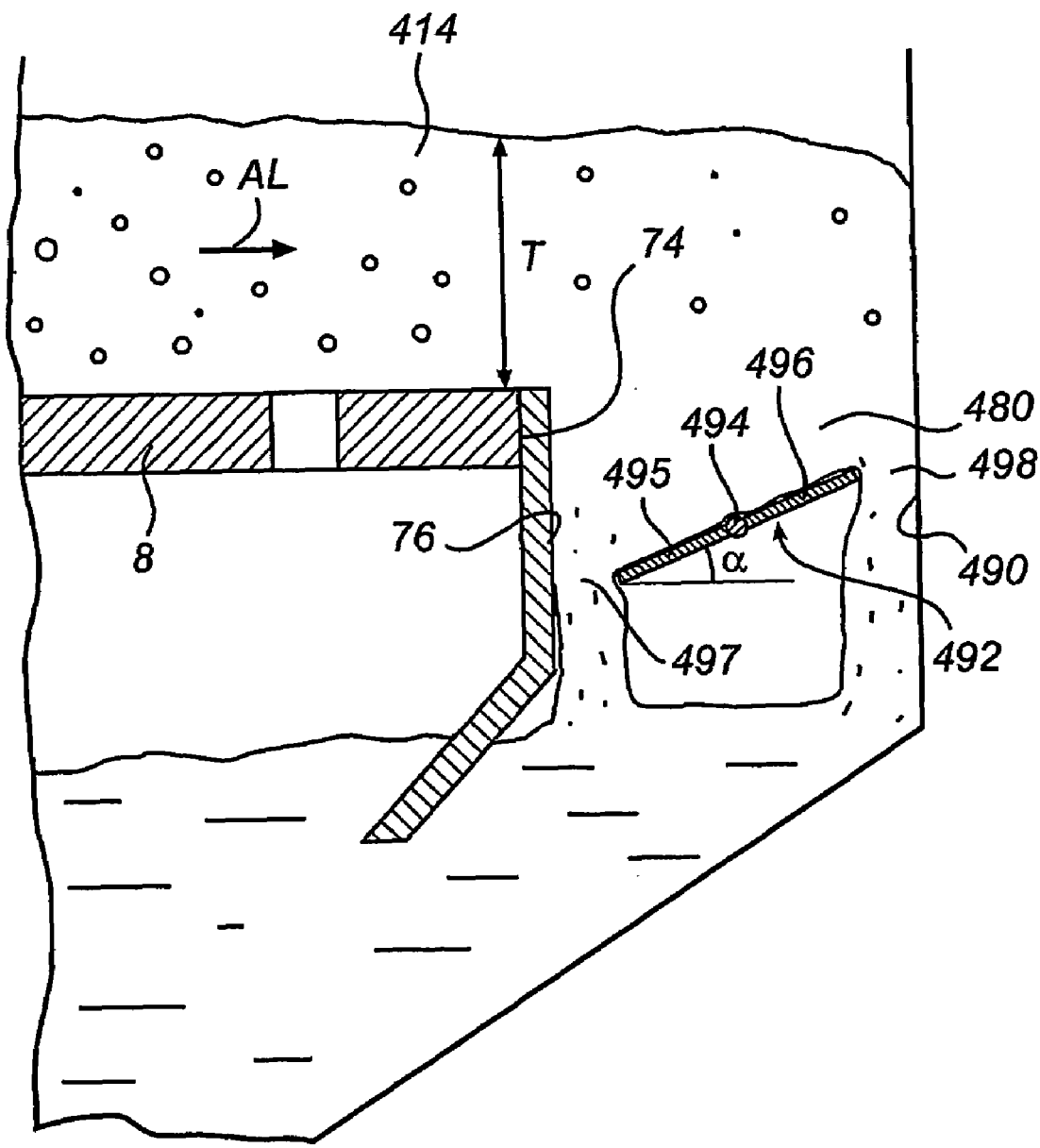

FIGS. 11, 12a and 12b illustrate a fifth embodiment of the invention in the form of a device 400. The device 400 bears great resemblance to the device 1 shown in FIGS. 1–4 and the parts of the device 400 which have direct equivalences in the device 1 have therefore been given the same designations and will here not be described in more detail. In the device 400 shown in FIG. 11, a flowing layer 414 of absorption liquid is passed horizontally over the rectangular apertured plate 8 in the direction of arrow AL for the purpose of separating sulphur dioxide from the flue gas 4 which passes through the flowing layer 414. The flowing layer 414 is fed to the apertured plate 8 in the manner as described above with reference, above all, to FIG. 3.

FIG. 12a illustrates an outlet zone 480, which is formed between the guide rail 76 attached to the third lateral edge 74 of the apertured plate 8 and a vertical wall 490 positioned opposite to the lateral edge 74, in the device 400. In the outlet zone 480, where the absorption liquid leaves the apertured plate 8 to flow down into the container 34, a throttle valve 492 is arranged horizontally and adapted to be turned by a motor 493 shown in FIG. 11. The throttle valve 492 has a horizontal shaft 494, which extends parallel to the third lateral edge 74 and which, as best seen in FIG. 12b, has a first flap blade 495 and a second flap blade 496, said flap blades 495, 496 extending along a common plane. Thus the motor 493 is arranged to turn the throttle valve 492 on the horizontal shaft 494.

FIG. 12b shows the angle α which is formed between the flap blades 495, 496 and the horizontal plane. As can be seen, a first constriction 497 is formed between the first blade 495 and the guide rail 76, and a second constriction 498 is formed between the second blade 496 and the wall 490. The pressure drop which the absorption liquid must overcome to flow through the outlet zone 480 and down into the container 34 is dependent on the width of these constrictions 497, 498. By means of the motor 493, the angle α and thus the width of the constrictions 497 and 498 can be set. At a small angle α, for instance an angle α of about 20–30°, the width of the constrictions 497, 498 will be small. The absorption liquid will thus be subjected to a high pressure drop when it should flow through the outlet zone 480 and down into the container 34, and thus the thickness of the layer 414 will increase until equilibrium is achieved between the thickness of the layer 414 and the pressure drop in the constrictions 497, 498. If a smaller thickness of the layer 414 is desired, the angle α is increased by means of the motor 493 which turns the shaft 494 and thus the flap blades 495 and 496, for instance to an angle α of about 40–50°, thereby increasing the width of the constrictions 497 and 498 so that the pressure drop decreases, in which case the absorption liquid is subjected to a lower pressure drop when it should flow through the outlet zone 480 and down to the container 34. Thus, the throttle valve 492 shown in FIGS. 11, 12a and 12b provides a further possibility of adjusting the thickness of the layer 414. This adjustment has its greatest effect on the thickness T of the layer 414 next to the outlet zone 480. An advantage of the throttle valve 492 thus is that it improves the control of the thickness of the layer 414 and, thus, is complementary to the control of the mammoth pump 62 to provide the thickness of the layer 414 that gives sufficient separation of sulphur dioxide in the current case of operation. A further advantage is that a thickness of the layer 414 will be more even seen over the entire apertured plate 8, which reduces the risk that the separation of sulphur dioxide will be low in the area next to the outlet zone 480.

Figure 13:
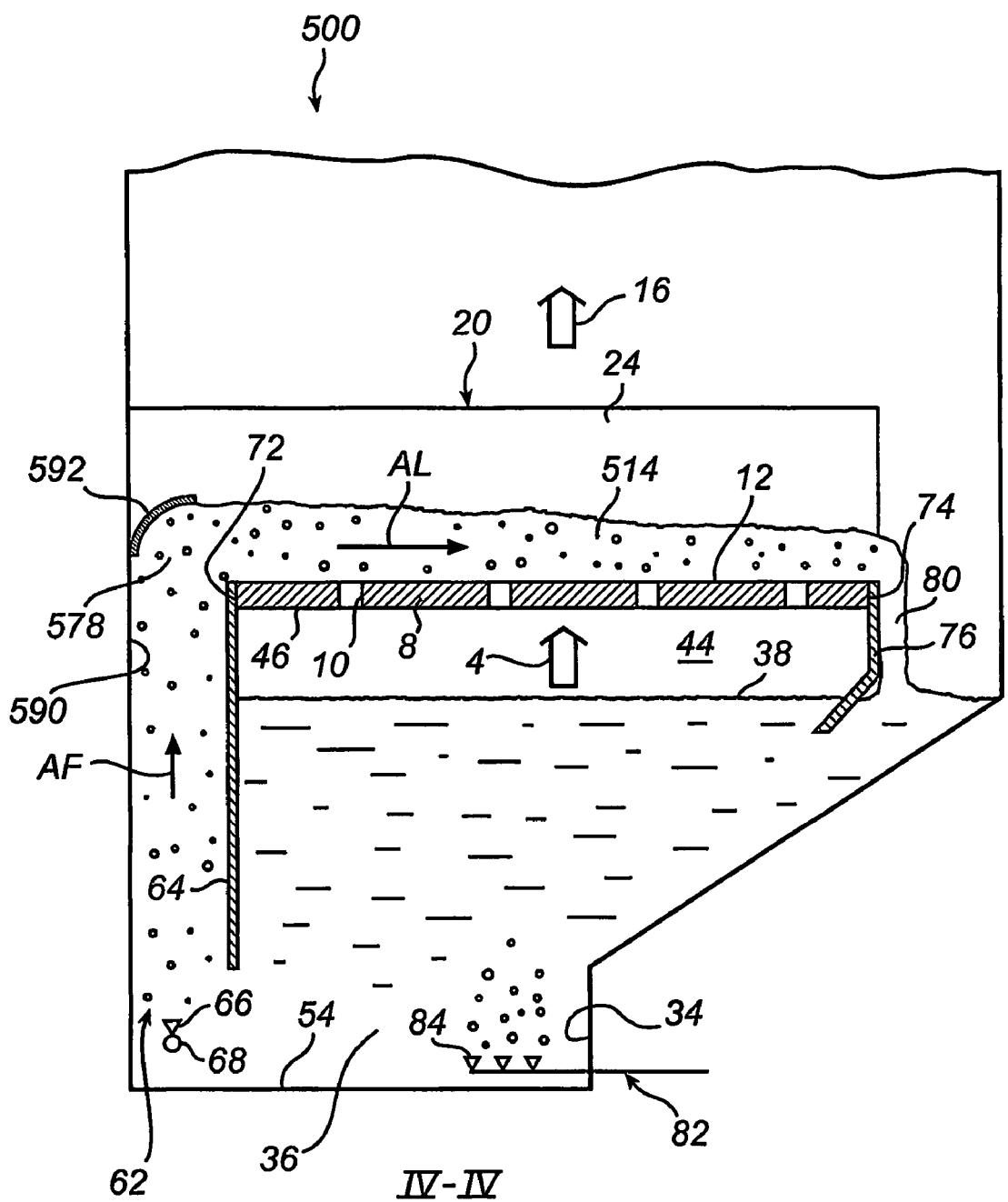
FIG. 13 is a sectional view in the vertical plane and schematically shows a device according to a sixth embodiment of the invention.

FIG. 13 illustrates, in a sectional view essentially corresponding to the sectional view shown in FIG. 4, a sixth embodiment of the invention in the form of a device 500. The device 500 bears great resemblance to the device 1 shown in FIGS. 1–4 and the parts of the device 500 which have direct equivalences in the device 1 have therefore been given the same designations and will here not be described in more detail. In the device 500 shown in FIG. 13, a flowing layer 514 of absorption liquid is passed horizontally over the rectangular apertured plate 8 in the direction of arrow AL from an inlet zone 578 to the outlet zone 80 for the purpose of separating sulphur dioxide from the flue gas 4 passing through the flowing layer 514. From a vertical wall 590 located opposite to the second lateral edge 72 extends a guide rail 592 in the outlet zone 578. The guide rail 592 extends essentially horizontally from the wall 590 towards the apertured plate 8 at a level, in the vertical direction, above the apertured plate 8. As shown in FIG. 13, the guide rail 592 is arcuate. The upward liquid flow AF, which is generated by the mammoth pump 62, will be deflected by the guide rail 592 from a vertical flow direction to a horizontal flow direction and form the flow AL which is conducted over the apertured plate 8. The guide rail 592 will damp the pulsations that often arise in a mammoth pump and will result in the mammoth pump 62 generating an even flow over the apertured plate 8. Furthermore, the deflection will cause, by means of the guide rail 592, that the absorption liquid flow, that has a vertical velocity in the tube 64, will obtain a higher initial horizontal velocity when leaving the outlet zone 578 and being passed over the apertured plate 8. This helps to make the thickness of the layer 514 more even over the entire apertured plate 8. It will be appreciated that guide rails of the type illustrated in FIG. 13 are also suited for use in the type of devices 100 and 200 as shown in FIG. 6 and FIGS. 7–9 respectively. For instance, in the device 100 there are suitably arranged a first guide rail extending towards the first part 109 of the apertured plate 108 and a second guide rail extending towards the second part 111 of the apertured plate 108. In the device 100 shown in FIG. 6, such guide rails would have the additional function of improving the distribution of the absorption liquid flow between the first part 109 and the second part 111. Of course, it is also possible to combine, in one and the same device, the throttle valve 492 as shown, for instance, in FIG. 12a, with the guide rail 592 shown in FIG. 13.

It will be appreciated that many modifications of the above-described embodiments of the invention are conceivable within the scope of the invention as defined by the appended claims.

The embodiments with rectangular apertured plates, as described in FIGS. 1–4, FIG. 6 as well as FIGS. 7–9, are well suited to produce module systems. Consequently, for instance 2–4 units of the device 1 can be built in parallel in order to jointly treat a flow of flue gas.

The above-described embodiments all have rectangular apertured plates. It will be appreciated that it is also possible to make circular, semicircular or sector-shaped apertured plates and arrange one or more outlet boxes along a lateral edge or part of a lateral edge of such an apertured plate.

In the embodiments described above, the flue gas is passed horizontally under the outlet box. It is also possible, but less preferred, to arrange nozzles in the wall of the outlet box facing the inlet 2 and, thus, let the coolant flow cool the essentially vertically flowing flue gas.

The apertured plate 8 can be made in several different ways and of a plurality of different materials. A specially preferred way is to design an apertured plate in the way as described in WO 96/00122. In apertured plates which are made of polymer material, a low temperature of the incoming gas, which can be achieved with the present invention, is a condition for the apertured plate not to be destroyed.

The mammoth pumps can be replaced by some other type of pump, for instance centrifugal pumps or propeller pumps. However, mammoth pumps are particularly preferred thanks to the simultaneous oxidation effect and their capability of operating with high solids contents of the liquid, without being subjected to excessive wear.

The embodiments described above are used for cleaning of flue gases from a coal-fired boiler. It will be appreciated that the invention is also applicable in other processes where sulphur dioxide is to be separated from a gas. Examples of such processes are firing of oil, peat, biofuel and waste, such as industrial and domestic waste; metallurgical processes, such as steel and copper manufacturing processes; cement manufacturing processes and refining processes, such as oil refining and natural gas refining. The device can also be used for absorption of other substances together with sulphur dioxide. Examples of such substances are hydrogen halides, such as hydrogen chloride, hydrogen fluoride, hydrogen bromide and hydrogen iodide; bromine; heavy metals, such as mercury, and other compounds.

The absorption of sulphur dioxide can be performed using a plurality of different absorption liquids. Examples of substances which when mixed with water are suitable for separation of sulphur dioxide are limestone, lime, dolomite, sodium hydroxide etc. The device is thus not limited to a special composition of the absorption liquid.

EXAMPLE

This Example relates to a test on a pilot scale involving a device of the type described above with reference to FIGS. 1–4 and 5a.

The apertured plate 8, which was made of polypropylene, had a thickness of 30 mm and a free hole area of about 3.6%, the holes 10 having a diameter of 22 mm. The holes 22 were bevelled at the underside 46 of the apertured plate 8. Limestone, that had such a grain size that about 96% passed through a mesh of 44 µm, was supplied to the container 34 in the form of a 25% by weight aqueous suspension. Additional water was supplied to the container 34. The absorption liquid 36 in the container contained in operation about 13% by weight of solids and had a pH of about 5.4.

Flue gas 4 from an oil-fired power plant was cleaned, the incoming gas unsaturated with water vapour had a temperature of about 190° and a sulphur dioxide concentration of about 2000 ppm. The flue gas 4 was passed through the inlet 2 to the gap 40. The liquid surface 38 in the container 34 was adjusted to such a level that the gas velocity in the gap 40 was about 15 m/s. The pressure difference between the point A and the point B was estimated at 4600 Pa. A first mammoth pump 50 fed a coolant flow corresponding to 3 l/m$^3$ of the current flue gas to the outlet box 20. A second mammoth pump 62 fed an absorption liquid flow corresponding to 20 l/m$^3$ of the current flue gas to the inlet zone 78 to form the layer 14. The height h$_l$ in the inlet box 20 was 700 mm, corresponding to a hydrostatic pressure P$_l$ of about 7700 Pa. The circular holes 32 in the bottom 30 of the outlet box 20 had a diameter of about 2 cm. The number of circular holes 32 was such that the velocity of the liquid leaving the holes 32 at the current hydrostatic pressure was about 1.5 m/s. As far as could be estimated in a visual check, the gas 4 entrained about 10% of the absorption liquid that left the circular holes 32 in the bottom 30 of the outlet box 20 while the rest of the absorption liquid reached the liquid surface 38. In the course of the test, no clogging of the holes 10 of the apertured plate 8 and no incrustations on the underside 46 of the apertured plate 8 could be observed. A clear flushing effect, that was provided by the absorption liquid entrained by the gas 4, could also be observed on the underside 46. A measurement showed that the gas 4 just under the apertured plate 8 kept a temperature of about 57° and was essentially saturated with water vapour. Thus, the relatively seen limited coolant flow was sufficient to achieve the desired cooling. The gas 16 that left the device 1 had a temperature of about 55° C. and contained about 22 ppm sulphur dioxide. Tests involving changes of the flow rate of flue gas were also performed and demonstrated that the cooling zone 6 as well as the layer 14 operated in a stable manner as the flue gas flow rate was varied.

The invention claimed is:

1. A method of separating by means of an aqueous absorption liquid sulphur dioxide from a gas containing sulphur dioxide, said method comprising the steps of:
    a. passing the gas containing sulphur dioxide through a contact zone;
    b. mixing the gas containing sulphur dioxide with a liquid flowing out of an outlet box while the gas containing sulphur dioxide is passing through the contact zone;
    c. then passing the gas containing sulphur dioxide upwards through an essentially horizontal apertured plate arranged beside the outlet box and having a flowing layer of the aqueous absorption liquid provided thereon;
    d. feeding a coolant flow to the outlet box so that the coolant flow passes therethrough and flows out into the contact zone; and
    e. feeding to the essentially horizontal apertured plate an absorption liquid flow that is essentially independent of the coolant flow so that the flowing layer of the aqueous absorption liquid provided on the essentially horizontal apertured plate is thereby formed by the absorption liquid flow and is operative to effect the separation of sulphur dioxide from the gas containing sulphur dioxide.

2. The method as claimed in claim 1 wherein the outlet box is elongated and extends along a lateral edge of the essentially horizontal apertured plate, and further comprising the step of passing the absorption liquid flow over the essentially horizontal apertured plate in a direction that is essentially parallel to the longitudinal direction of the outlet box.

3. The method as claimed in claim 2 further comprising the steps of:
    a. collecting in a container containing liquid the coolant flow flowing out of the outlet box, the liquid surface of the liquid contained in the container being located at a level below the contact zone;
    b. passing the gas containing sulphur dioxide through a passage located under the outlet box and extending between the liquid surface of the liquid contained in the container and the outlet box; and
    c. controlling a parameter that is representative of the level of the liquid surface of the liquid contained in the container, and that is thus also representative of the height of the passage in such a manner that the average velocity of the gas containing sulphur dioxide in the passage is in the range of 5–35 m/s.

4. The method as claimed in claim 3 further comprising the step of collecting in a common container the coolant flow flowing out of the outlet box as well as the absorption liquid flow flowing out of the essentially horizontal apertured plate.

5. The method as claimed in claim 4 further comprising the step of feeding from the common container the coolant flow as well as the absorption liquid flow.

6. The method as claimed in claim 5 wherein a hydrostatic liquid pressure is present in the outlet box, and further comprising the step of controlling by means of the coolant flow the ratio of the hydrostatic liquid pressure in the outlet box to the pressure difference between a first point located just before the contact zone and a second point located above the liquid surface in the outlet box in such a manner that the hydrostatic liquid pressure in the outlet box is greater than the pressure difference between the first point located just before the contact zone and the second point located above the liquid surface in the outlet box.

7. The method as claimed in claim 1 further comprising the step of passing the flow of gas essentially horizontally under the outlet box.

8. A device for separating by means of an aqueous absorption liquid sulphur dioxide from a gas containing sulphur dioxide, said device comprising:
    a. an inlet for the gas containing sulphur dioxide and an outlet for the gas following the separation of sulphur dioxide therefrom;
    b. at least one essentially horizontal apertured plate having an upper side and mounted between said inlet and said outlet, said at least one essentially horizontal apertured plate being arranged so as to allow passage of the gas containing sulphur dioxide from below said at least one essentially horizontal apertured plate, said at least one essentially horizontal apertured plate further being arranged so as to enable a flowing layer of the absorption liquid to be carried on said upper side of said at least one essentially horizontal apertured plate;
    c. at least one outlet box arranged beside said at least one essentially horizontal apertured plate and so as to enable liquid to be passed thereby;
    d. a distributing means arranged in said at least one outlet box to distribute liquid into the gas containing sulphur dioxide coming from said inlet before the gas containing sulphur dioxide is passed upwards and through said at least one essentially horizontal apertured plate;
    e. a first pumping means for feeding a coolant flow to said outlet box; and
    f. a second pumping means for feeding an absorption liquid flow that is essentially independent of the coolant flow to said at least one essentially horizontal apertured plate so that the flowing layer of the absorption liquid carried on said upper side of said at least one essentially horizontal apertured plate is thereby formed by the absorption liquid.

9. The device as claimed in claim 8 further comprising a container arranged to collect the coolant flow flowing out of said outlet box, said container containing liquid, the liquid surface of the liquid contained in said container being located under said outlet box so as to thus form a passage between the liquid surface of the liquid contained in said container and said outlet box for the gas containing sulphur dioxide.

10. The device as claimed in claim 9 further comprising a common container arranged to collect the coolant flow flowing out of said outlet box as well as the absorption liquid flow flowing out of said at least one essentially horizontal apertured plate.

11. The device as claimed in claim 10 wherein the liquid surface of the liquid contained in said container extends both essentially under entirely said at least one essentially horizontal apertured plate and essentially under entirely said outlet box.

12. The device as claimed in claim 11 wherein said at least one essentially horizontal apertured plate has the shape of a rectangular plate and has both a first lateral side edge extending parallel to said outlet box and a second lateral side edge extending perpendicular to said first lateral side edge of said at least one essentially horizontal apertured plate, said first pumping means as well as said second pumping means each consisting of a pump arranged in succession along a line extending parallel to said second lateral side edge of said at least one essentially horizontal apertured plate.

13. The device as claimed in claim 11 wherein said at least one essentially horizontal apertured plate has the shape of a rectangular plate and is divided into two parts by said second pumping means, said second pumping means when seen from above having the form of at least one elongate large pump and being arranged to distribute the absorption liquid flow over said two parts of said at least one essentially horizontal apertured plate, and wherein said at least one essentially horizontal apertured plate has a first lateral side edge, and wherein said outlet box is elongated and is arranged along said first lateral side edge of said at least one essentially horizontal aperture plate so as to form an essentially right angle to the longitudinal direction of said at least one elongate pump of said second pumping means.

14. The device as claimed in claim 13 further comprising a second essentially horizontal apertured plate having the shape of a substantially rectangular plate and being divided into two parts by said second pumping means, as seen from above said second pumping means being in the form of a second elongate pump and being arranged to distribute the absorption liquid flow over said two parts of said second essentially horizontal apertured plate, and wherein said second essentially horizontal apertured plate has a first lateral side edge, and also comprises a second elongate outlet box arranged along said first lateral side edge of said second essentially horizontal apertured plate so as to form a substantially right angle to the longitudinal direction of said second elongate pump, and an inlet gap extending between said first outlet box and said second outlet box for incoming gas containing sulphur dioxide.

15. The device as claimed in claim 9 further comprising a first container arranged to collect the coolant flow flowing out of said outlet, and a second container arranged to collect at least part of the absorption liquid flow flowing out of said essentially horizontal apertured plate.

16. The device as claimed in claim 15 further comprising a third pumping means arranged to feed liquid from said first container to said second container through a conduit.

17. The device as claimed in claim 15 wherein said first pumping means and said second pumping means are arranged to feed the coolant flow and the absorption liquid flow, respectively, from said second container.

18. The device as claimed in claim 17 wherein said distributing means comprises at least one nozzle having at least one characteristic measurement selected from a minimum hole diameter and a minimum gap width of 1–8 cm.

19. The device as claimed in claim 8 wherein said essentially horizontal apertured plate has an underside and said outlet box has a bottom located essentially on the same level as said underside of said essentially horizontal apertured plate.

20. The device as claimed in claim 8 further comprising an inlet zone, an outlet zone, and an adjustable throttle valve, and wherein absorption liquid is conducted over said essentially horizontal apertured plate from said inlet zone to said outlet zone, and said adjustable throttle valve is operable for adjusting the thickness of the layer of absorption liquid being in said outlet zone.

* * * * *